United States Patent
Hewicker

(10) Patent No.: US 11,624,711 B2
(45) Date of Patent: Apr. 11, 2023

(54) METHOD AND DEVICE FOR THE OPTICAL INSPECTION OF CONTAINERS

(71) Applicant: KRONES AG, Neutraubling (DE)

(72) Inventor: Alexander Hewicker, Woerth an der Donau (DE)

(73) Assignee: KRONES AG, Neutraubling (DE)

(*) Notice: Subject to any disclaimer, the term of this patent is extended or adjusted under 35 U.S.C. 154(b) by 255 days.

(21) Appl. No.: 17/069,566

(22) Filed: Oct. 13, 2020

(65) Prior Publication Data

US 2021/0116387 A1 Apr. 22, 2021

(30) Foreign Application Priority Data

Oct. 22, 2019 (DE) .......................... 102019128503.8

(51) Int. Cl.
*G01N 21/88* (2006.01)
*G06T 7/00* (2017.01)
*H04N 5/225* (2006.01)

(52) U.S. Cl.
CPC ......... *G01N 21/8851* (2013.01); *G06T 7/001* (2013.01); *H04N 5/2256* (2013.01); *G01N 2021/8887* (2013.01); *G06T 2207/20224* (2013.01)

(58) Field of Classification Search
CPC ............... G01N 21/93; G01N 21/9009; G01N 21/8851; G01N 21/9036; G01N 21/9018; G01N 2021/8887; H04N 5/2256; G06T 7/001; G06T 2207/20224
See application file for complete search history.

(56) References Cited

U.S. PATENT DOCUMENTS

| 6,035,072 | A | 3/2000 | Read | |
| 6,212,962 | B1* | 4/2001 | Lucas | G01N 21/90 73/865.8 |
| 6,466,691 | B1 | 10/2002 | Heuft | |
| 2006/0244959 | A1* | 11/2006 | Yagita | G01N 21/9027 356/239.6 |
| 2009/0278286 | A1* | 11/2009 | Schmidt | G01N 21/9081 264/408 |
| 2013/0271755 | A1* | 10/2013 | Lindner | G01N 21/00 356/240.1 |
| 2014/0015960 | A1* | 1/2014 | Niedermeier | G01N 21/909 348/128 |

(Continued)

FOREIGN PATENT DOCUMENTS

DE 19646678 A1 5/1998
DE 202004007783 U1 9/2005

(Continued)

*Primary Examiner* — Sang H Nguyen
(74) *Attorney, Agent, or Firm* — McCoy Russell LLP

(57) ABSTRACT

Method for the optical inspection of containers, where the containers are transported with a conveyor as a container mass flow, where the containers are each captured with an optical inspection unit as first image data, and where the first image data is evaluated with an image processing unit for contamination and/or defects on the respective container, where the first image data of several containers is overlaid to form an overlay image, and where the overlay image is evaluated for the presence of points of contamination in a beam path of the optical inspection unit.

16 Claims, 3 Drawing Sheets

(56) References Cited

U.S. PATENT DOCUMENTS

| | | | | |
|---|---|---|---|---|
| 2014/0174127 A1* | 6/2014 | Dalstra | ................ | B07C 5/3408 |
| | | | | 65/29.11 |
| 2015/0204797 A1* | 7/2015 | Colle | .................... | G01N 21/90 |
| | | | | 356/239.4 |
| 2017/0154417 A1* | 6/2017 | Niedermeier | ........ | H04N 13/254 |
| 2019/0283445 A1* | 9/2019 | Sones | ...................... | G06T 7/90 |

FOREIGN PATENT DOCUMENTS

| | | |
|---|---|---|
| DE | 102009011270 A1 | 9/2010 |
| DE | 102012002174 A1 | 8/2013 |
| DE | 102012008586 A1 | 10/2013 |
| DE | 112014004645 T5 | 8/2016 |
| EP | 3561769 A2 | 10/2019 |

\* cited by examiner

METHOD AND DEVICE FOR THE OPTICAL INSPECTION OF CONTAINERS

CROSS-REFERENCE TO RELATED APPLICATION

The present application claims priority to German Patent Application No. 102019128503.8 filed on Oct. 22, 2019. The entire contents of the above-listed application is hereby incorporated by reference for all purposes.

TECHNICAL FIELD

The invention relates to a method and a device for the optical inspection of containers.

BACKGROUND AND SUMMARY

Such methods and devices are typically used to inspect the containers for contamination and/or defects. For this purpose, the containers are transported by a conveyor as a container mass flow to an optical inspection unit which comprises, for example, an illumination device and a camera, so that the containers can be inspected in transmitted light and/or in incident light. However, any other optical arrangements with which the containers can be captured as images are also conceivable. The containers are captured with the optical inspection unit as image data which is then evaluated with an image processing unit for contamination and/or defects on the respective container. If contamination and/or a defect is now recognized on a container, then it is, for example, cleaned again or recycled.

For example, such methods and devices are used for side wall, base and/or filling level inspection of empty containers or containers already filled with a product.

In rare cases, it can happen that points of contamination are present in the beam path of the optical inspection unit which are then recognized by the image processing unit as contamination and/or defects on one or more faultless containers and lead to their being classified as faulty and then unintentionally discharged from the container mass flow. This can be recognized, for example, by an automatic monitoring unit or by an operator, so that cleaning of the optical inspection unit is then initiated.

The drawback there is that such contamination of the optical structure is only recognized if it leads to multiple consecutive poor inspection results or if the false discharge rate has increased significantly. Only slight contamination not leading to poor inspection results in direct succession is consequently often not recognized in this way. This can then lead to a sporadic false discharge which remains undetected.

An inspection device with at least one camera for inspecting objects, in particular containers such as bottles, cans or the like, and with an image evaluation device is known from DE 20 2004 007783 A1.

The object of the present invention is therefore to provide a method and a device for the optical inspection of containers with which it can be detected more reliably whether there are points of contamination present in the beam path of the optical inspection unit.

To satisfy this object, the invention provides a method for the inspection of containers where said containers are transported with a conveyor as a container mass flow, where said containers are each captured with an optical inspection unit as first image data, and where said first image data is evaluated with an image processing unit for contamination and/or defects on said respective container, wherein, said first image data of several containers is overlaid to form an overlay image, and said overlay image is evaluated for the presence of points of contamination in a beam path of said optical inspection unit.

Extensive investigations by the applicant have shown that the points of contamination in the beam path of the optical inspection unit are always mapped at similar locations in the image data of several different containers. Due to the first image data of several containers being overlaid, the image signal of the points of contamination is more pronounced in the overlay image. In contrast, the contamination and/or defects on the respective containers are fainter therein, since they are typically mapped at different points in the image data. Even when a small amount of image data is overlaid, the points of contamination can be recognized, for example, as a darkened area in the overlay image. Due to the fact that the overlay image is evaluated for the presence of the points of contamination in the beam path of the optical inspection unit, they can be recognized particularly reliably and suitable measures can then be initiated. For example, operator staff can be warned at an early stage so that they can clean the optical inspection unit. With the method, even points of slight contamination can be identified so that suitable measures can be initiated particularly at an early stage and regular operation does not necessarily have to be interrupted for this purpose. For example, cleaning can take place during a changeover of a container treatment machine associated with the optical inspection unit.

The optical inspection method can be used in a beverage processing system. The method can be arranged upstream or downstream of a container manufacturing process, a cleaning process, a filling and/or closing process. The method can be used in a full bottle or empty bottle inspection machine comprising the optical inspection unit. For example, the method can be used to inspect returnable containers that have been returned.

The containers can be provided to receive beverages, foods, hygiene products, pastes, chemical and biological and/or pharmaceutical products. The containers can be formed as bottles, in particular as plastic bottles or glass bottles. Plastic bottles can in particular be PET, PEN, HD-PE or PP bottles. It is also conceivable that the containers are preforms for producing the plastic bottles. They can also be biodegradable containers or bottles, the main components of which are made of renewable raw materials such as sugar cane, wheat or corn. The containers can be provided with a closure, for example with a crown cap, screw closure, tear-off closure or the like. The containers can also be present as empties, preferably without a closure.

It is conceivable that the method is employed to examine the side wall, the base, the mouth and/or the content of the containers. The contamination can be foreign objects, product residues, residues of labels and/or the like. The defects can be, for example, damage to the containers, for example chipped glass. It is also conceivable that there are points of the material that are poorly produced, such as, for example, local material thinning and/or thickening.

The containers can be transported with the conveyor as the container mass flow to the optical inspection unit, preferably as a single-lane container mass flow. The conveyor can comprise a carousel and/or a linear conveyor. It is conceivable, for example, that the conveyor comprises a conveyor belt on which the containers are transported standing upright into an inspection area of the optical inspection unit. Receiving elements that receive one or more containers during transport are also conceivable. The container can also be transported by way of lateral straps if, for example, the lighting transilluminates the container base and the camera inspects the base through the container mouth.

The optical inspection unit can comprise an illumination device and a camera. In the case of the illumination device, the light can be generated with at least one light source, for example with a light bulb, a fluorescent tube and/or with at least one LED. The light can preferably be generated with a matrix of LEDs and be emitted in the direction of the light exit surface. The light exit surface can be formed to be larger than the camera view of the container. It is also conceivable that the light exit surface only illuminates part of the camera view of the container. The light exit surface can in part or entirely emit the light in a diffused manner. The light exit surface can preferably comprise a diffusion disk with which the light from the at least one light source is diffusely scattered over a large area towards the camera.

The camera can capture a respective partial area of a container, exactly one container, or several containers, and the light transmitted or reflected thereover with an objective and with an image sensor. The image sensor can be, for example, a CMOS or a CCD sensor. It is conceivable that the camera transmits the image data, in particular the first image data or the second image data, to the image processing unit by way of a data interface. It is conceivable that the light is generated by the illumination device, then transilluminates the containers and/or is reflected therefrom and then captured by the camera.

"Image data" can presently mean at least one camera image of one or more of the containers. For example, the containers can each be captured in the first and/or the second image data from one or more image perspectives. The camera can capture the polarization property, the intensity property, the color property and/or the phase property of the light for each image point of the image data.

The image processing unit can process the image data, in particular the first and/or the second image data, with a signal processor and/or with a CPU (central processing unit) and/or a GPU (graphics processing unit) and/or with a TPU (tensor processing unit) and/or or with a VPU (vision processing unit). It is also conceivable that the image processing unit comprises a memory unit, one or more data interfaces, for example a network interface, a display unit and/or an input unit. It is also conceivable that the image processing unit evaluates the at least one camera image using image processing algorithms that are present as a computer program product in the memory unit.

The fact that the first image data of the several containers is overlaid to form the overlay image can presently mean that the first image data of several containers is added up. The first image data of the several containers can there optionally each be weighted with a weighting factor. "Added up" can presently mean that the same respective image points of the first image data of several containers are added up.

"The fact that the overlay image is evaluated for the presence of the points of contamination in the beam path of the optical inspection unit" can presently mean that the image processing unit recognizes a local change in the overlay image, for example, darkening due to the points of contamination.

A further container can be captured as second image data with the optical inspection unit, where the overlay image is multiplied by a first weighting factor and the second image data is multiplied by a second weighting factor and then overlaid to form a further overlay image, and where the further overlay image is evaluated for the presence of points of contamination in the beam path of the optical inspection unit. The further overlay image can subsequently replace the (previous) overlay image and the method step described above can be carried out again iteratively with a further container. As a result, only the overlay image and the second image data of the respective container most recently inspected need to be kept in a memory unit of the image processing unit for calculating the further overlay image. The first image data of the previously captured several containers can then be deleted and consequently does not consume any memory space. The first image data of a plurality of containers, for example 10, 100 or even more sets of the first image data, does not need to be kept in the memory for continuously determining a more current overlay image. The second image data and the first image data can be identical in structure and differ only in that the several containers were each captured as the first image data and the further container as the second image data. In other words, the first image data and the second image data can only differ by the fact that they were acquired from different containers.

The magnitude of the first weighting factor can be greater than the magnitude of the second weighting factor. Due to the fact that the overlay image is already overlaid from several containers, the overlay image can then be weighted more heavily than the second image data of the further container. It is conceivable that both the first weighting factor and the second weighting factor are positive or that both the first weighting factor and the second weighting factor are negative. For example, the first weighting factor can be proportional to the number of several containers and the second weighting factor can be correspondingly proportional to exactly one container (i.e. to the one further container). As a result, both the overlay image and the second image data are weighted according to the number of containers inspected for this purpose.

The first weighting factor and the second weighting factor can be in a range between 0 and 1, where the first weighting factor and the second weighting factor add up to 1. As a result, the further overlay image has a similar range of values as the (previous) overlay image and the second image data.

In other words, the first weighting factor can be calculated from the number of several containers divided by the number of several containers increased by 1, where the second weighting factor is calculated from 1 divided by the number of several containers increased by 1. This allows the weighting factors to be determined particularly easily.

The first image data, the overlay image, the second image data and/or the further overlay image can each be normalized image by image to the same value range, in particular to a value range from 0 to 255 or from 0 to 65535. This enables the evaluation of the image data or the overlay images mentioned, respectively, to be carried out particularly reliably with the same evaluation parameters.

It is conceivable that a further container is captured with the optical inspection unit as second image data, where the overlay image and/or the further overlay image is multiplied by a third weighting factor and subtracted from the second image data in order to computationally eliminate the points of contamination in the beam path of the optical inspection unit from the second image data. As a result, the second image data can be cleaned up in such a way that the points of contamination therein only appear very slightly or not at all. As a result, the contamination and/or defects can be identified particularly reliably, although the points of contamination are already present in the beam path of the optical inspection unit.

If there are points of contamination in the beam path of the optical inspection unit in the overlay image or in the further overlay image, a threshold value sensitivity for evaluating the contamination and/or the defects on the containers can be adjusted, in particular be lowered. As a result, there are fewer false rejections of containers that actually do not have any contamination and/or defects. It is conceivable that the threshold sensitivity is only lowered in certain regions. For example, the threshold sensitivity can be lowered only in an image region in which the points of contamination are mapped in the first image data and/or in the second image data. Other regions of the image can remain unaffected. Consequently, the detection of the contamination and/or defects in the image region works even more reliably without the points of contamination.

Faulty containers can be discharged from the container mass flow after the evaluation of the contamination and/or the defects. This means that the faulty containers can be excluded from further processing and be recycled, for example, before they are filled with a product.

Before being captured with the optical inspection unit, test image data can be captured without a container, where the test image data is overlaid to form a test overlay image which is then evaluated for already existing points of contamination in the beam path of the optical inspection unit. As a result, the existing points of contamination can be identified before the actual container inspection, so that the inspection of the first container is particularly reliable. The test image data can be overlaid, for example, by adding together to form the test overlay image. "Adding together" can presently mean that the same respective image points of the test image data are added up. The test image data can be, for example, 10-20 test images without a container.

The containers can be illuminated with a plurality of light sources of the illumination device when being captured, where at least one of the light sources is activated on the basis of the overlay image for indicating the points of contamination to an operator for subsequent cleaning, and where the remaining light sources of the illumination device are deactivated. As a result, the operator can identify and clean the points of contamination in a particularly simple manner. It is conceivable that the plurality of light sources is arranged in an array-like manner, for example in a tetragonal or hexagonal array, in particular where the light sources are designed as LEDs. The points of contamination can preferably be associated with the light sources on the basis of the overlay image. For example, during calibration, the light sources can be activated individually and image data can be captured with the camera. As a result, the light sources can each be associated with the corresponding image points of the image data and thus also to the image points of the overlay image.

Alternatively, the points of contamination can be displayed graphically to the operator on a screen, in particular the overlay image with the points of contamination being marked.

It is conceivable that the method for optical inspection comprises a manual or automated cleaning method for the optical inspection unit, in particular of the camera and/or the illumination device. As a result, the points of contamination can be removed from the optical inspection unit and the container can consequently be inspected more reliably. In the manual or automated cleaning method, the illumination device can be cleaned using a cleaning agent, for example, by flushing with a cleaning fluid. When an intervention threshold has been reached, a warning message can preferably be displayed to the operator, for example, on a screen, with which the cleaning process is initiated. In addition, the conveyor and/or an associated container handling machine can be stopped when the intervention threshold has been reached. The intervention threshold can presently mean a degree of contamination.

To satisfy the object, the invention additionally provides a device for the optical inspection of containers having a conveyor for transporting said containers as a container mass flow, an optical inspection unit for capturing said containers as first image data, with an image processing unit for evaluating said first image data for contamination and/or defects on said containers, wherein said image processing unit is configured to overlay said first image data of several containers to form an overlay image and to evaluate said overlay image for the presence of points of contamination in a beam path of said optical inspection unit.

Due to the fact that the image processing unit is configured to overlay the first image data of the several containers to form the overlay image, the image signal of the points of contamination is more pronounced in the overlay image. In contrast, the contamination and/or defects on the respective containers are fainter therein, since they are typically mapped at different points in the image data. Even when a small amount of image data is overlaid, the points of contamination can be recognized, for example, as a darkened area in the overlay image. Due to the fact that the image processing unit is configured to evaluate the overlay image for the presence of the points of contamination in the beam path of the optical inspection unit, they can be recognized particularly reliably and suitable measures can then be initiated. For example, operator staff can be warned at an early stage so that they can clean the optical inspection unit. With the method, even slight points of contamination can be identified so that suitable measures can be initiated in particular at an early stage and regular operation does not necessarily need to be interrupted for this purpose. For example, cleaning can take place during a changeover of a container treatment machine associated with the optical inspection unit.

The device for the optical inspection of containers can be configured to carry out the method described above. The device can comprise mutatis mutandis the features described above regarding the method individually or in any combination.

The device for the optical inspection can be arranged in a beverage processing system. The beverage processing system can comprise container treatment machines, in particular a container manufacturing machine, a rinser, a filler, a closer, a labeling machine, a direct printing machine and/or a packaging machine. It is conceivable that the device for the optical inspection is associated with one of the container treatment machines mentioned. It is conceivable, for example, that containers processed or manufactured by the container treatment machine are optically inspected using the device. It can also be used, for example, to optically inspect preforms for the container manufacturing machine, preferably in a blow molding machine. The conveyor can connect one of the container treatment machines mentioned to the device for the optical inspection and/or be associated therewith. The device can be used for filled or empty bottle inspection. It is conceivable, for example, that the device is configured for the optical inspection of returned reusable containers.

The inspection unit can comprise an illumination device for illuminating the containers and/or a camera for capturing the containers as image data. Image data can presently mean the first or the second image data. The containers can then be illuminated or captured over a large area, so that the contamination and/or defects can be identified particularly easily and reliably by way of the image processing unit. The illumination device can be configured to emit light over an area from an extended light exit surface, in particular in the direction of the camera. The optical inspection unit can be configured such that the container is inspected between the illumination device and the camera. For example, the conveyor can be arranged between the illumination device and the camera for inspecting individual containers of the container mass flow. This allows the containers to be inspected in transmitted light. It is also conceivable that the illumination device is configured for incident light illumination and the light emitted therefrom is reflected from the containers toward the camera during the inspection.

The device can comprise a discharge device for discharging faulty containers from the container mass flow after the contamination and/or defects have been evaluated. This makes it particularly easy to recycle defective containers.

BRIEF DESCRIPTION OF THE FIGURES

Further features and advantages of the invention shall be explained in more detail below with reference to the embodiments illustrated in the figures, where.

DETAILED DESCRIPTION

Figure 1:
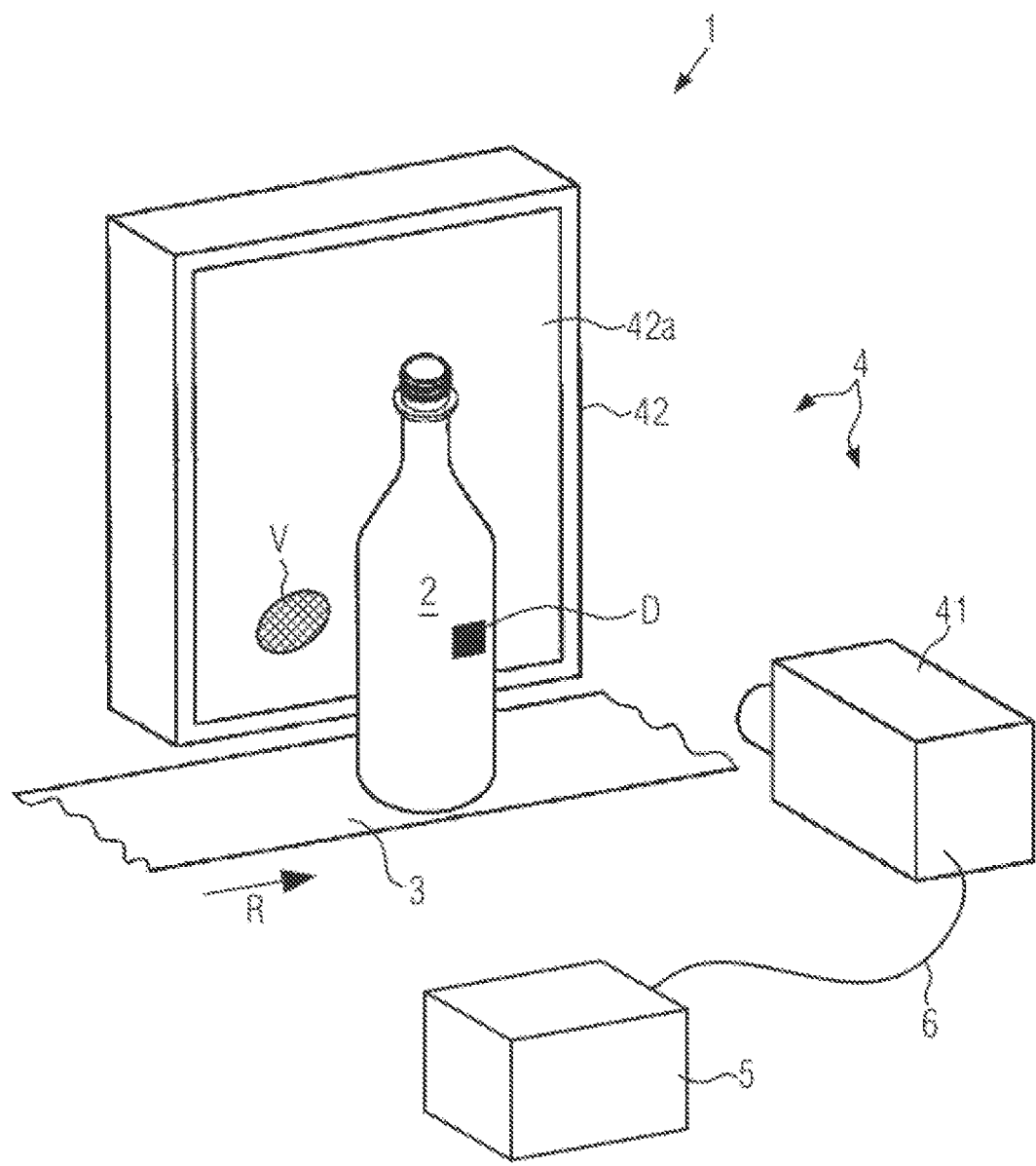
FIG. 1 shows an embodiment according to the invention of a device for the optical inspection of containers in a perspective view.

FIG. 1 shows an embodiment of a device 1 according to the invention for the optical inspection of containers 2 in a perspective view in more detail. The device is described in more detail in the context of the embodiment according to the invention of method 100 for the optical inspection of containers 2 shown in IG. 2.

It can be seen in FIG. 1 that containers 2 are transported by conveyor 3 in direction R as a container mass flow. Conveyor 3 is configured merely by way of example as a conveyor belt on which containers 2 are transported standing upright. However, any other types of conveyors that allow optical access to container 2 are also conceivable. Only a single container 2 of the container mass flow can presently be seen by way of example. It is understood that several containers 2 are transported on conveyor 3, in particular sequentially one behind the other, and form the container mass flow.

Optical inspection unit 4 comprises an illumination device 42 for illuminating containers 2 and a camera 41 for capturing containers 2 as image data. Containers 2 are transilluminated between illumination device 42 and camera 41 and thus optically inspected. However, an illumination device with incident light is also conceivable in addition or as an alternative.

Illumination device 42 comprises the areal light exit surface 42a which is configured in the manner of a luminous disk emitting the light substantially homogeneously and in an areal manner. However, any other type of illumination device 42 that is suitable for inspection regarding the respective inspection task is also conceivable. For example, illumination device 42 comprises a matrix of LEDs which backlight a frosted glass pane as a result of which the light is emitted from light exit surface 42a in a diffused manner. Directed emission of the light is also conceivable.

Furthermore, camera 41, which captures containers 2 as image data, in particular as camera images, can be seen. For this purpose, camera 41 comprises, for example, a CCD or CMOS sensor and an objective. Both area and line scan cameras are conceivable there.

Image processing unit 5 connected to camera 41 via an image data line 6 can also be seen. For example, the image data can thus be transmitted from camera 41 to image processing unit 5 as digital signals It is also conceivable that image processing unit 5 is integrated into camera 41. Image processing unit 5 is configured to overlay first image data I1, I2 of several containers 2A, 2B to form an overlay image 1 and to evaluate overlay image U1 for the presence of points of contamination V in a beam path of optical inspection unit 4.

Furthermore, defect D can be seen on container 2 which is mapped together with container 2 in the image data. Contamination on container 2 is additionally or alternatively conceivable. Defect D is captured in the image data as a locally darkened area on container 2.

In addition, point of contamination V, which likewise appears as a slight darkening in the image data behind container 2, can be seen in the beam path of optical inspection unit 4. Point of contamination V is located there on light exit disk 42a of illumination device 42 merely by way of example. However, it is also conceivable that point of contamination V is located on the objective of camera 41 or on another optical element. For example, on a protective pane or on a mirror in a mirror cabinet.

Figure 2:
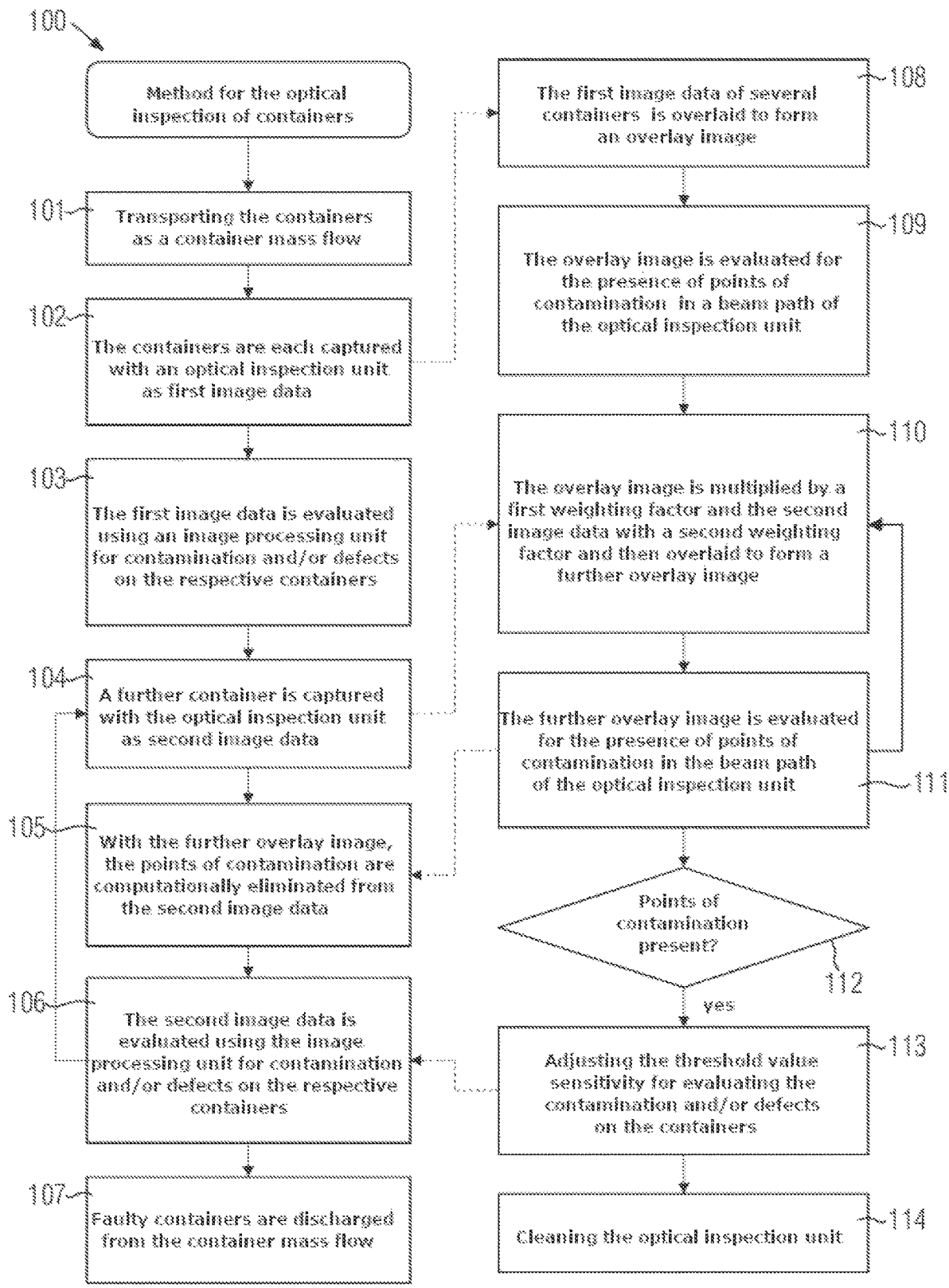
FIG. 2 shows an embodiment according to the invention of a method of the invention for the optical inspection of containers as a flow chart, in particular to be carried out with the device from FIG. 1.

The device from FIG. 1 is employed according to method 100 for the optical inspection of container 2 from FIG. 2 as follows:

In step 101, containers 2 are first transported by conveyor 3 as a container mass flow.

In step 102, they are each captured with optical inspection unit 4 as first image data. It is conceivable that containers 2 are captured individually or in groups.

The first image data is then evaluated in step 103 using image processing unit 5 for contamination and/or defects D on respective container 2. For example, an image processing method is there employed in which local gray value changes in the image data are recognized and marked. A threshold value can then be used to decide whether respective container 2 exhibits contamination or a defect D.

However, it is possible that point of contamination V in the beam path of optical inspection unit 4 is wrongly classified as contamination and/or as a defect D. This then leads to an undesired false rejection of actually faultless containers. Consequently, it should be recognized as early as possible that point of contamination V is present in the beam path of optical inspection unit 4.

Figure 3A:
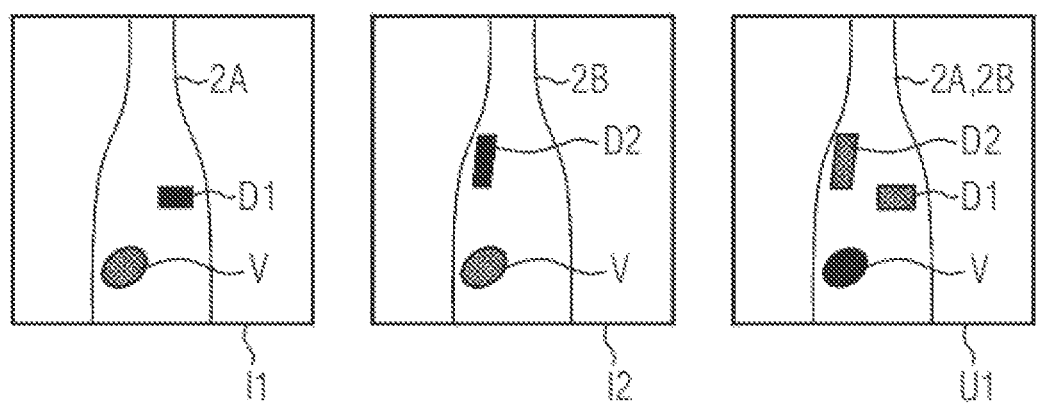
FIGS. 3A-3C show examples of the first image data, the second image data, the overlay image as well as the further overlay image as schematic image representations.

FIG. 3A shows by way of example that first image data I1, I2 of several containers 2A, 2B is overlaid to form an overlay image U1 for identifying point of contamination V according to step 108.

It can be seen in first image data I1 of first container 2A that first container 2A exhibits a first defect D1. In addition, point of contamination V on illumination device 42 is shown as a locally somewhat darkened image area.

Furthermore, it can be seen in first image data I2 of second container 2B that the latter exhibits contamination D2. In addition, point of contamination V on illumination device 42 can also be seen in first image data I2 as a locally somewhat darkened area.

When overlaying in step 108, the first two image data I1, I2 is first normalized to a value range of, for example, 0-255 and then overlaid to form overlay image U1. Both first image data I1 and I2 are preferably added during the overlaying. The overlay image U1 can then likewise be normalized again to a suitable value range, for example, likewise from 0 to 255. It can be seen in overlay image U1 that containers 2A, 2B are overlaid and defect D1 or contamination D2, respectively, appears fainter. In contrast, point of contamination V is more pronounced so that it can now be seen better.

Overlay image U1 is subsequently evaluated with image processing unit 5 in accordance with step 109 for the presence of points of contamination V. Due the fact that contaminations D2 and/or defects D1 are fainter as compared to points of contamination V in overlay image U1, point of contamination V in the optical beam path of optical inspection unit 4 can be detected particularly reliably. For example, an image processing method is used to identify points of contamination V with which locally darkened areas are identified in overlay image U1.

In a further step 104, further containers are captured with the optical inspection unit as second image data I3 or I4. In order to now identify point of contamination V even more reliably, a further overlay image U2 is determined in accordance with step 110 from second image data I3 of a third container 2C. A further defect D3 and point of contamination V in the beam path of optical inspection unit 4 can be seen on container 2C.

Figure 3B:
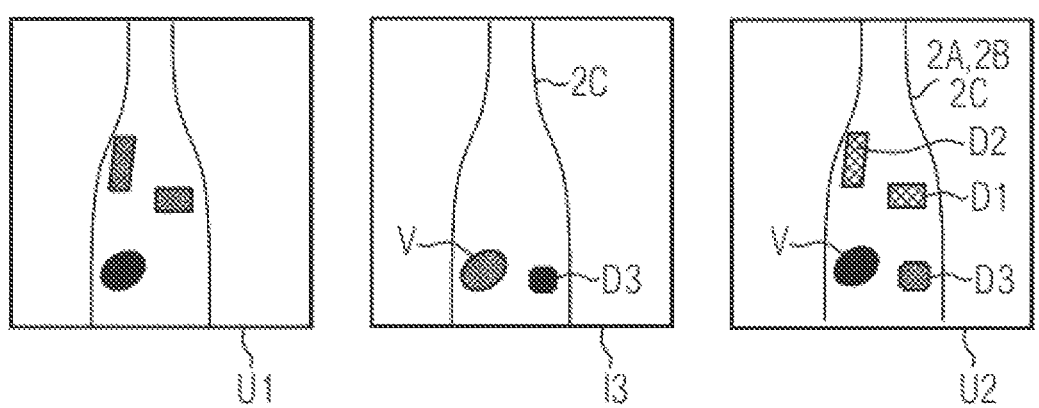

This can be seen in FIG. 3B: For this purpose, overlay image U1 determined in step 108 is multiplied by a first weighting factor and second image data I3 with a second weighting factor and then overlaid to form further overlay image U2.

For example, two containers 2A, 2B were captured to determine overlay image U1 from FIG. 3A. Accordingly, the first weighting factor is calculated from the number of containers 2A, 2B divided by the number of containers 2A, 2B increased by 1, i.e. in this case to ⅔. Furthermore, the second weighting factor is calculated as 1 divided by the number of containers 2A, 2B increased by 1, i.e. ⅓.

Particularly advantageous, both weighting factors are therefore positive, where the first weighting factor is greater than the second weighting factor since the information from several containers 2A, 2B or their image data, respectively, is already present in overlay image U1. In contrast, only a single container 2C was captured with second image data I3 and is now also intended to be included in the overlaid information of further overlay image U2.

The further overlay image U2 thus overlaid can be seen on the right-hand side in FIG. 3B. The image information from second image data D3 is weighted less than that of overlay image U1. It can also be seen that point of contamination V in further overlay image U2 is shown even more pronounced than in overlay image U1 from FIG. 3A and can therefore be recognized even more reliably.

Further overlay image U2 can now replace previous overlay image U1 and steps 110-111 can be repeated iteratively with the second image data of further containers 2, where point of contamination V in the beam path of optical inspection unit 4 then becomes increasingly pronounced in further overlay images over the contamination and/or defects on containers 2.

In step 111, further overlay image U2 is evaluated with image processing unit 5 for the presence of points of contamination V in the beam path of optical inspection unit 4. This is done analogously to step 109. If there is now a point of contamination present, then the threshold value sensitivity for evaluating contamination D2 and/or defects D1, D3 on containers 2 is adjusted following decision 112 in step 113 so that, for example, the detection based on the second image data in step 106 is less sensitive. The threshold value sensitivity can also be adjusted only in a partial area of image data I1-I4 in which point of contamination V is mapped.

Figure 3C:
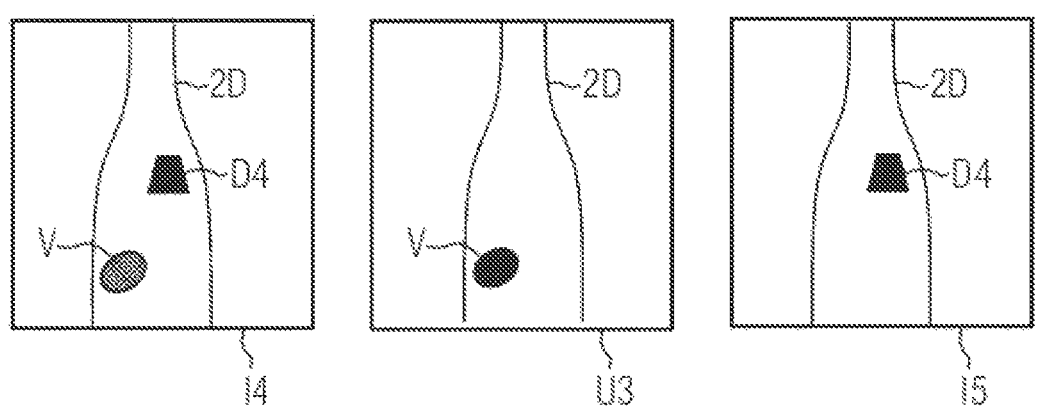

Furthermore, using the example of a fourth container 2D, it can be seen in FIG. 3C that, in step 105, point of contamination V with further overlay image U2 is computationally eliminated from of the second image data I4.

For this purpose, a further container 2 is captured with optical inspection unit 4 according to step 104 as second image data I4. It can be seen that container 2D exhibits contamination D4. It can also be seen that point of contamination V in the beam path of optical inspection unit 4 is furthermore presently mapped as a slight local darkening Furthermore, further overlay image U3 can be seen which was determined from a large number of containers 2 in accordance with steps 110 and 111. For example, image data from 10, 100 or even more containers 2 can be overlaid for this purpose. For this purpose, the second image data of a further container 2 is again overlaid onto further overlay image U2 according to step 110 so that further overlay image U3 is calculated again. Consequently, only preceding overlay image U1, U2 always needs to be retained in the memory and not the first or second image data of a large number of containers 2.

It can also be seen in FIG. 3C that, according to step 105, with the again further overlay image U3, point of contamination V is computationally eliminated from second image data I4. For example, further overlay image U3 is multiplied by a third weighting factor and then subtracted from second image data I4. It can be seen that point of contamination V can consequently no longer be seen in image data I5, so that contamination D4 (or also a defect) can be identified particularly reliably with image processing unit 5 in step 106. This takes place in step 106 corresponding to step 103.

If point of contamination V now exceeds a predetermined level of contamination, then optical inspection unit 4 is cleaned in step 114. A manual or automated cleaning method can be used for this purpose, for example, in which light exit disk 42a is flushed with a cleaning agent.

Containers 2 can be illuminated with a plurality of light sources of lighting device 42 arranged in an array when being captured, for example with an array of LEDs, where at least one of the light sources is activated on the basis of overlay image U1 in order to indicate points of contamination V to an operator for subsequent cleaning, and where the remaining light sources of lighting device 42 are deactivated. This can be done, for example, between steps 113 and 114.

Alternatively, points of contamination V can be displayed graphically to the operator on a screen prior to step 114, in particular overlay image U1 with the points of contamination being marked.

In addition, containers 2 identified as faulty in step 103 or 106, respectively, are discharged from the container mass flow in step 107.

Due to the fact that image data I1, I2, I3 of containers 2A, 2B, 2C is overlaid, the image signal of points of contamination V is more pronounced in overlay image U1 or in further overlay image U2. In contrast, contamination D2 and/or defects D1, D3 on respective containers 2A, 2B, 2C are fainter therein, since they are typically mapped at different points in image data I1, I2, I3. Even when a small amount of image data I1, I2 is overlaid, points of contamination V can be recognized, for example, as a darkened area in the overlay image U1. Due to the fact that overlay image U1 is evaluated for the presence of points of contamination V in the beam path of optical inspection unit 4, they can be recognized particularly reliably and suitable measures can then be initiated. For example, operator staff can be warned at an early stage so that they can clean optical inspection unit 4. A manual or automated cleaning method of device 1, in particular of camera 41 and/or illumination device 42, is conceivable. In the automated cleaning method, for example, illumination device 42 can be flushed with a cleaning fluid. When an intervention threshold has been reached, a warning message can preferably be displayed to the operator, for example, on a screen. In addition, device 1 and/or a container treatment machine associated with device 1 can be stopped when the intervention threshold has been reached. With device 1 and method 100, even points of slight contamination V can be identified so that suitable measures can be initiated in particular at an early stage and regular operation does not necessarily have to be interrupted for this purpose. For example, cleaning can take place during a changeover of a container treatment machine associated with optical inspection unit 4.

It is conceivable that test image data can be captured prior to step 102 with optical inspection unit 4 without a container, where the test image data is overlaid to form a test overlay image which is then evaluated for already existing points of contamination V in the beam path of optical inspection unit 4.

It is understood that the features mentioned above in the embodiments described are not restricted to these feature combinations but are also possible individually or in any other combination.

The invention claimed is:

1. A method for an optical inspection of containers, comprising:
    transporting the containers with a conveyor as a container mass flow,
    capturing each of said containers as first image data, and evaluating said first image data for contamination and/or defects on a respective container, and
    overlaying said first image data of several containers with image data of different containers to form an overlay image, and evaluating said overlay image for a presence of points of contamination in a beam path used for capturing the first image data.

2. The method according to claim 1, where faulty containers are discharged from the container mass flow after an evaluation of said contamination and/or said defects.

3. The method according to claim 1, where test image data without a container is captured before said containers are captured, and where said test image data is overlaid to form a test overlay image which is then evaluated for already existing points of contamination in the beam path.

4. The method according to claim 1, where said containers are illuminated with a plurality of light sources of an illumination device when being captured, where at least one of said light sources is activated on a basis of said overlay image for indicating said points of contamination to an operator for subsequent cleaning, and where the remaining light sources of said illumination device are deactivated.

5. The method according to claim 1, where the overlay image is evaluated for presence of points of the contamination in the beam path but not located on the containers.

6. A device for the optical inspection of containers, for carrying out the method according to claim 1, comprising:
    the conveyor for transporting said containers as the container mass flow,
    a camera and illumination device for capturing said containers as first image data, and
    a processor and memory for evaluating said first image data for contamination and/or defects on said containers,
    where said processor is configured to overlay said first image data of several containers to form an overlay image and to evaluate said overlay image for the presence of points of contamination in the beam path used for capturing the first image data.

7. A method for an optical inspection of containers, comprising:
    transporting the containers with a conveyor as a container mass flow,
    capturing each of said containers as first image data, and evaluating said first image data for contamination and/or defects on a said respective container, and
    overlaying said first image data of several containers with image data of different containers to form an overlay image, and evaluating said overlay image for a presence of points of contamination in a beam path used for capturing the first image data,
    where a further container is captured as second image data, where said overlay image is multiplied by a first weighting factor and said second image data is multiplied by a second weighting factor and then overlaid to form a further overlay image, and where said further overlay image is evaluated for the presence of points of contamination in the beam path used for capturing the first image data.

8. The method according to claim 7, where a magnitude of the first weighting factor is greater than the magnitude of the second weighting factor.

9. The method according to claim 7, where the first weighting factor and the second weighting factor are in a range between 0 and 1, and where the first weighting factor and the second weighting factor add up to 1.

10. The method according to claim 7, where the first weighting factor is calculated from a number of said several containers divided by the number of said several containers increased by 1, where the second weighting factor is calculated from 1 divided by the number of said several containers increased by 1.

11. The method according to claim 10, where said first image data, said overlay image, said second image data and/or said further overlay image are each normalized image by image to a same value range, in particular to a value range from 0 to 255 or from 0 to 65535.

12. The method according to claim 11, where a further container is captured as second image data, and where said overlay image and/or said further overlay image is multiplied by a third weighting factor and subtracted from said second image data in order to computationally eliminate said points of contamination in the beam path used for capturing the second image data.

13. The method according to claim 7, where, if points of contamination are present in the beam path in said overlay image or in said further overlay image, a threshold value sensitivity for evaluating the contamination and/or defects on said containers is adjusted, in particular lowered.

14. A device for the optical inspection of containers, for carrying out the method according to claim 7, comprising:
- a conveyor for transporting said containers as a container mass flow,
- a camera and illumination device for capturing said containers as first image data, and
- a processor and memory for evaluating said first image data for contamination and/or defects on said containers,
- where said processor is configured to overlay said first image data of several containers to form an overlay image and to evaluate said overlay image for the presence of points of contamination in a beam path used for capturing the first image data.

15. The device according to claim 14, where said illumination device illuminates said containers and the camera captures said containers as image data.

16. The device according to claim 14, where said device comprises a discharge device for discharging faulty containers from the container mass flow after the contamination and/or defects have been evaluated.

\* \* \* \* \*